Nov. 20, 1951     S. RINKEL     2,575,564
MOTOR LIFT ATTACHMENT
Filed Nov. 14, 1949
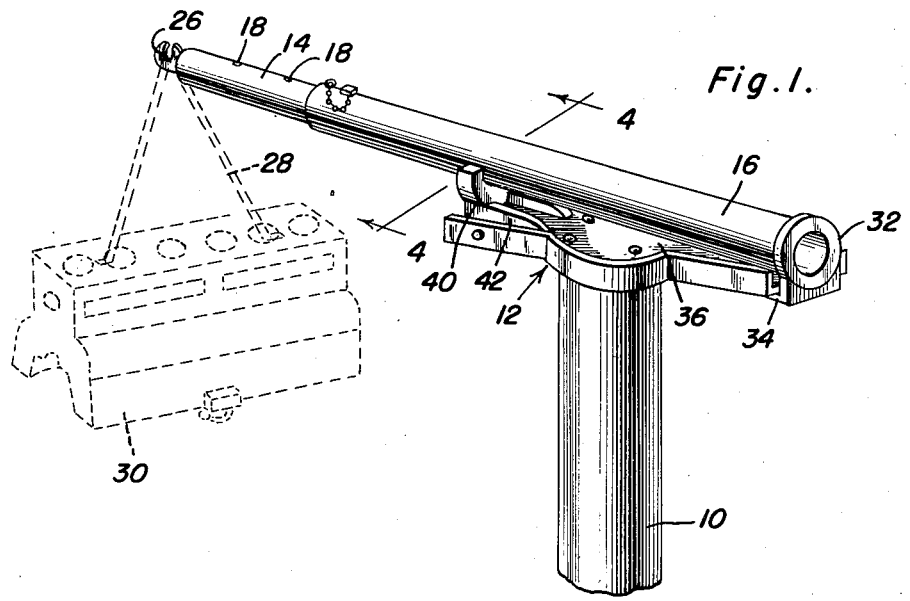
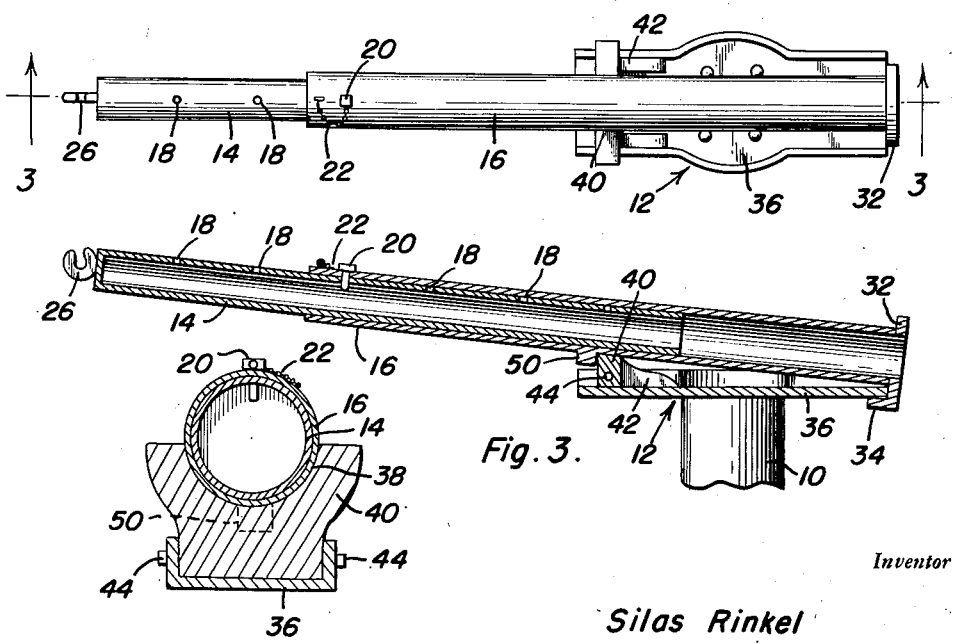
Inventor
Silas Rinkel
By *Clarence A. O'Brien and Harvey B. Jacobson*
Attorneys Patented Nov. 20, 1951

2,575,564

UNITED STATES PATENT OFFICE 2,575,564

MOTOR LIFT ATTACHMENT

Silas Rinkel, Bismarck, N. Dak.

Application November 14, 1949, Serial No. 126,975

3 Claims. (Cl. 212—55)

This invention relates to novel and useful improvements in mechanics' equipment.

An object of this invention is to raise heavy objects, as engine blocks, by means of an attachment which is removably secured to the cradle assembly of a conventional power lift, the assembly including a pair of extensibly connected members which may be adjusted so as to regulate the effective length, one of the members having a hook at one end for accommodation of a cable or chain or analogous member, and the other of said extensible members having a locking assembly which is rapidly attachable and detachable with the cradle mechanism or assembly at the top of the hydraulic lift post.

Other objects and features, such as reduction of time and effort involved in replacing or removing engines from automobiles, will become apparent in following the description of the illustrated form of the invention.

In the drawings:

Figure 1 is a fragmentary perspective view of a part of a conventional hoist or lift with the attachment applied, showing schematically an engine block being lifted;

Figure 2 is a top view of the attachment and its association with the cradle assembly of the hoist;

Figure 3 is a longitudinal sectional view taken substantially on the line 3—3 of Figure 2 and in the direction of the arrows; and Figure 4 is a transverse view taken substantially on the line 4—4 of Figure 1 and in the direction of the arrows.

This attachment for an ordinary and conventional lift is designed to assist the mechanic in various jobs and at a minimum of cost. Engine lifting may be accomplished by chain fall assemblies or ordinary engine pullers, but this mechanism is rather expensive. Moreover, in many instances, sufficient structural accommodations are not present to install a chain fall.

However, the majority of garages, service stations and other analogous establishments are provided with lifts. They are usually hydraulically operative and always include a vertical post 10 which is raised and lowered by suitable controls. A cradle assembly, generally indicated at 12, is also provided in connection with a great number of conventional lifts. The present invention employs the cradle assembly 12 for accommodation of the attachment.

The attachment consists of a pair of extensible members, as the tube 14 which slides in the bore of the sleeve 16. The tube is provided with a number of openings 18 which are adapted to accommodate the pin 20 which is passed through a suitable opening in the sleeve 16. A small chain or cord 22 which is fixed at one end to the sleeve 16 prevents the pin 20 from becoming inadvertently lost.

The tube 14 has a closed end with a hook 26 secured thereto. This hook is adapted to accommodate a chain or cable 28 which is secured to any heavy object, as the engine block 30. It is quite obvious that other articles may be lifted, as rear axle housings together with a differential or object totally disconnected from vehicles, such as shipping crates, etc.

At the end of the sleeve 16 remote from the hook 26, there is an angular bracket 34 comprising an integral ring 32 which is fixed on said sleeve 16. This bracket 34 acts as a portion of a means for releasably fastening the extensible members to the cradle assembly 12. The bracket 34 which extends substantially parallel to the longitudinal axis of the tube and sleeve is disposed under the plate 36 which forms a part of the cradle assembly. The outside surface of the sleeve 16 rests in a recess 38 formed in the bracket 40. This bracket 40 has a foot 42 projecting from the lower rear end thereof which seats on the top surface of the plate 36. Suitable means, as the pin 44 passed through openings in the bracket 40 and side flanges of the plate 36, is employed for holding the bracket fixed on said plate.

The sleeve 16 rests in the recess 38 at a point intermediate the ends of the two extensible members but closer to the plate 34 so that the two extensible members are naturally disposed with their coincident longitudinal axes at an angle with respect to the longitudinal axis of the post 10.

In order to prevent the extensible members from sliding from the cradle assembly 12, the stop lug 50, which is fixed to the exterior of the sleeve 16, engages the bracket 40, preventing the sleeves from moving in one axial direction. The bracket 34 prevents the sleeve and tube from moving in the opposite axial direction.

Having described the invention, what is claimed as new is:

1. For use with a lift which includes a vertically operable post with a cradle assembly secured thereto, said assembly including a plate, an attachment for lifting heavy objects comprising an elongated member, means secured to said member releasably securing the member to the cradle assembly, said means including a fastening bracket disposed partially below the plate of said cradle assembly and lockingly engaging the bottom surface of said plate preventing said member from sliding in one direction from said assembly, and means secured to said member and spaced from said bracket and contacting said assembly remote from the point of contact of said fastening bracket and the plate preventing said member from sliding from said assembly in the opposite direction.

2. For use with a lift which includes a vertically operable post with a cradle assembly having a plate with a bracket disposed thereon, said assembly being secured to said post, an attachment for lifting heavy objects and comprising a pair of extensible members, a hook secured to one of the members and means releasably securing the other member to the cradle assembly, said means including a fastening bracket disposed partially below said cradle assembly and lockingly contacting the bottom surface of the plate of said assembly, said members having a common longitudinal axis which is disposed at an angle with respect to the axis of the post, said fastening bracket being secured to said other member at the end remote from said hook, and a stop lug on said other member reacting on the bracket of the cradle assembly preventing said members from sliding in one direction from said cradle assembly.

3. In a lift which includes a post with a cradle assembly at the upper end thereof, said assembly including a base plate, an attachment for lifting heavy objects, said attachment comprising an elongated member, means secured to one end of said member and contacting one edge and the bottom surface of said plate near said edge for preventing said member from sliding from said plate in one direction which is parallel to the longitudinal axis of said elongated member, means secured to said member and remote from the place at which the first mentioned means is attached to said member and contacting a substantially vertical surface of said assembly preventing said member from sliding from said assembly in a direction substantially parallel to the longitudinal axis of said member and opposite to the first mentioned direction.

SILAS RINKEL.

REFERENCES CITED

The following references are of record in the file of this patent:

UNITED STATES PATENTS

| Number | Name | Date |
| --- | --- | --- |
| 1,127,636 | Kindred | Feb. 9, 1915 |
| 2,509,950 | Zierke | May 30, 1950 |